United States Patent

Issler et al.

[11] Patent Number: 5,653,156
[45] Date of Patent: Aug. 5, 1997

[54] LIGHT METAL PISTON FOR HIGHLY STRESSES INTERNAL COMBUSTION ENGINES

[75] Inventors: Wolfgang Issler, Schwaikheim; Helmut Kollotzek, Mutlangen, both of Germany

[73] Assignee: Mahle GmbH, Stuttgart, Germany

[21] Appl. No.: 522,323

[22] PCT Filed: Jun. 24, 1994

[86] PCT No.: PCT/DE94/00747

§ 371 Date: Sep. 7, 1995

§ 102(e) Date: Sep. 7, 1995

[87] PCT Pub. No.: WO95/05553

PCT Pub. Date: Feb. 23, 1995

[30] Foreign Application Priority Data

Aug. 18, 1993 [DE] Germany ............ 43 27 772.1

[51] Int. Cl.⁶ .................................. F16J 1/14
[52] U.S. Cl. ........................................ 92/187
[58] Field of Search ............... 92/187, 188, 189, 92/190, 191, 238; 123/193.6

[56] References Cited

U.S. PATENT DOCUMENTS

| | | | |
|---|---|---|---|
| 1,351,239 | 8/1920 | Flammang | 92/189 |
| 3,000,676 | 9/1961 | Cheney et al. | 123/193.6 X |
| 3,357,318 | 12/1967 | Packard | 92/187 |
| 3,473,209 | 10/1969 | Packard et al. | 92/187 X |
| 3,745,889 | 7/1973 | Hill et al. | 92/187 |
| 4,124,010 | 11/1978 | Fiedler | 123/193.6 |
| 4,727,795 | 3/1988 | Murray et al. | 92/189 |
| 5,119,777 | 6/1992 | Mielke et al. | 123/193.6 |

FOREIGN PATENT DOCUMENTS

| | | | |
|---|---|---|---|
| 387931 | 9/1990 | European Pat. Off. | |
| 1300937 | 7/1962 | France . | |
| 3036062 | 4/1982 | Germany | 123/193.6 |
| 3609019 | 3/1986 | Germany . | |
| 56-52544 | 5/1981 | Japan | 123/193.6 |

*Primary Examiner*—F. Daniel Lopez
*Attorney, Agent, or Firm*—Collard & Roe, P.C.

[57] ABSTRACT

A light metal piston for highly stressed internal combustion engines has a combustion cavity in the piston head. In order to keep low the stresses at the edge of the combustion cavity without unnecessarily increasing the stresses in the support and hub of the piston pin, the piston has the following combination of characteristics: the combustion cavity (5) in the piston head (4) is not armoured; the bore (9) of each piston pin hub (8) is flared (cambered) towards the inner end of the hub in at toast the inner end (10) of a partial area X of the total length of the hub bore; the bore (9) of each piston pin hub (8) is designed as a molded bore (9) that is outwardly enlarged with a substantially conical shape at least in one partial area Z; the bore (9) of each piston pin hub (8) has on one side a slanted pocket (12) that starts at its inner end (10).

12 Claims, 2 Drawing Sheets

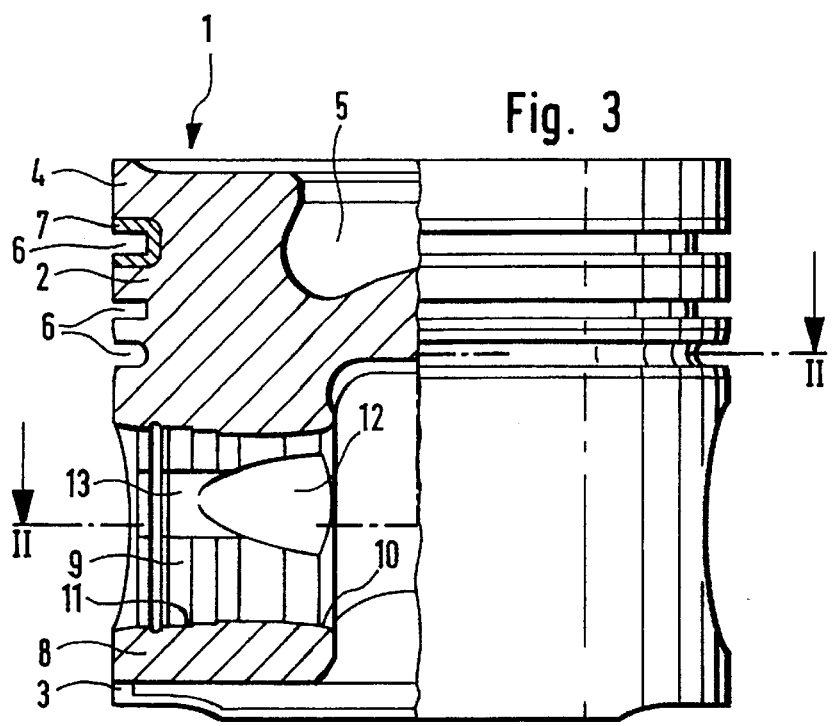
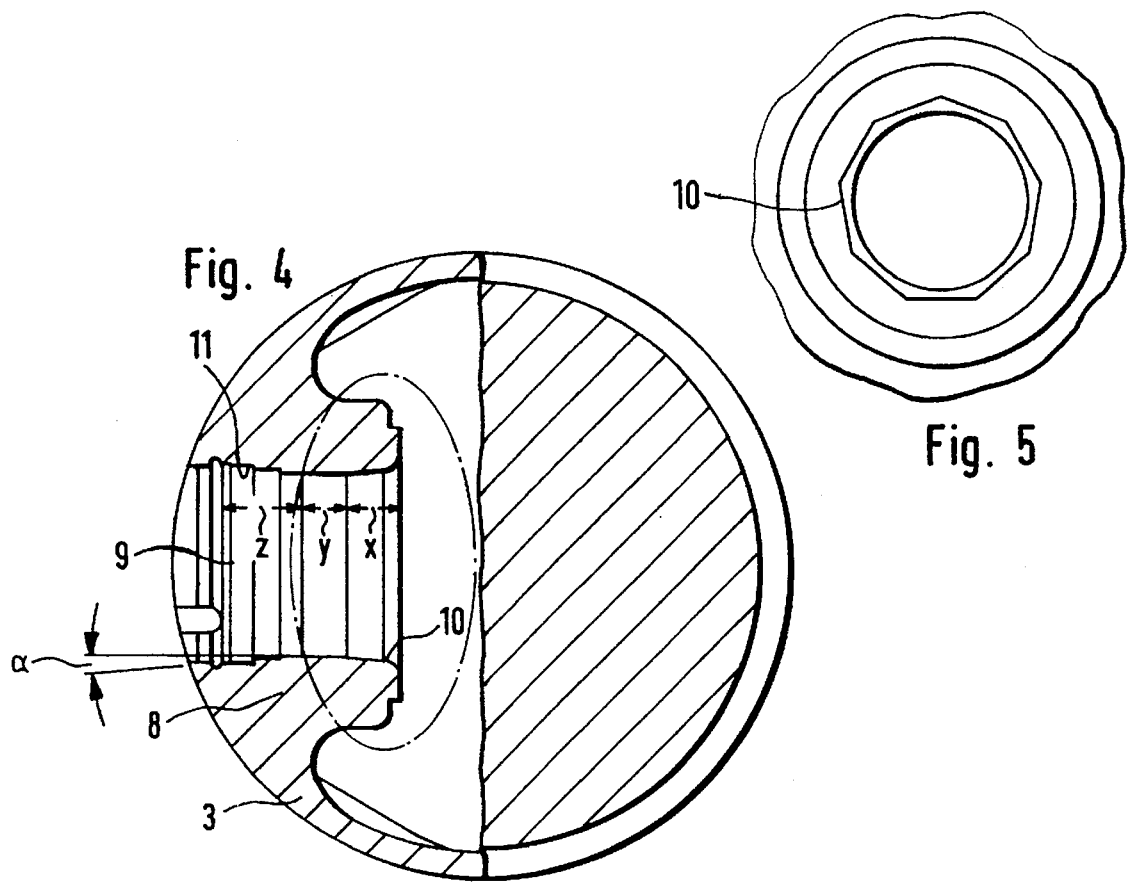

LIGHT METAL PISTON FOR HIGHLY STRESSES INTERNAL COMBUSTION ENGINES

The invention relates to a light metal piston for highly stressed internal combustion engines.

In connection with such light metal pistons that are known in practical life, various measures have been implemented—for the purpose of permitting such pistons to be capable of withstanding the stresses caused by the ignition pressure—to reduce, on the one hand, especially bending through of the piston pin, which may lead to cracks in the bosses of the piston pin, and to protect the combustion chamber trough against incipient cracks. For such purpose, such light metal pistons are, for example provided with bushes in the bores of the piston pin bosses, and the trough of the combustion chamber is fitted with an additional reinforcement.

For the purpose of preventing incipient boss cracking, it is known from DE-PS 36 09 019 to provide the boss bores, in each case on both sides, with pocket-like recesses from the inner end of the boss bores, such recesses extending across a certain length in the longitudinal direction of the boss bores. A connection between said recesses and the end of the boss bore on the outer side of the piston is provided by corresponding grooves in the boss bores.

The problem of the present invention is to find in a simple way of engineering a piston in connection with which the stresses on the edge of the combustion chamber trough are kept low without unnecessarily increasing the stresses in the bosses of the piston pin.

Said problem is solved with a light metal piston with the features set forth below.

Advantageous developments of the invention are contained in the dependent claims.

The invention is explained in greater detail in the following on a preferred exemplified embodiment shown in the drawing, in which:

FIG. 3 shows a lateral, partly sectional view of another embodiment of the invention;

FIG. 4 shows a top view of the section along line II—II in FIG. 3; and

FIG. 5 shows a cross-sectional view of the section enclosed by the dotted line in FIG. 4.

Figure 1:
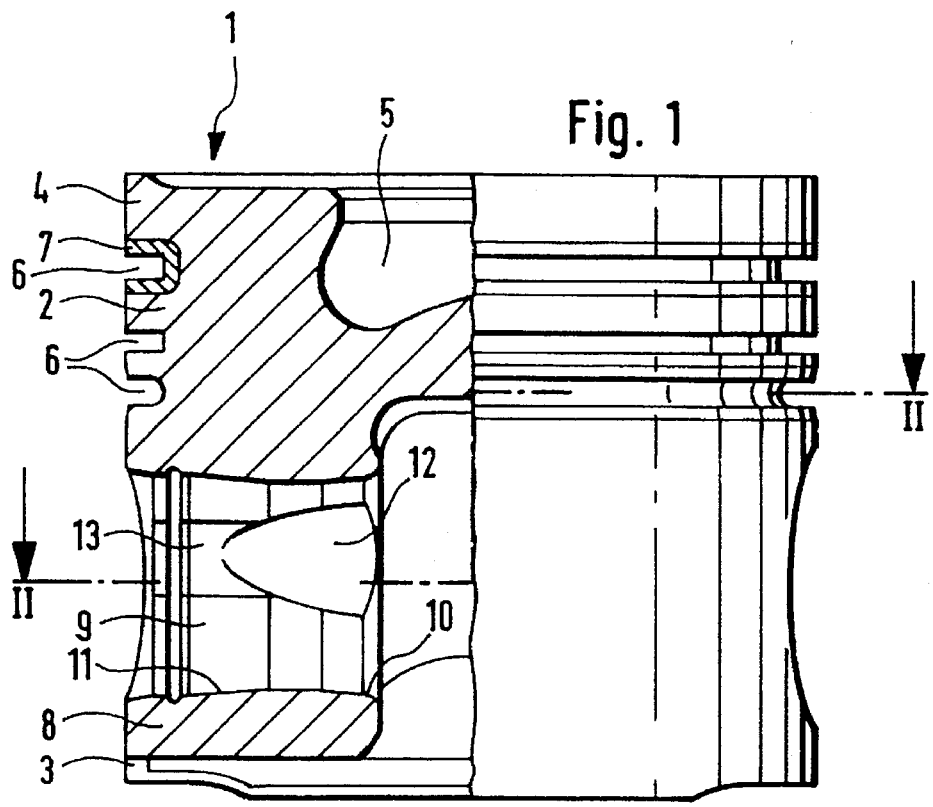
FIG. 1 shows a lateral, partly sectional view of a light metal piston according to the invention.
Figure 2:
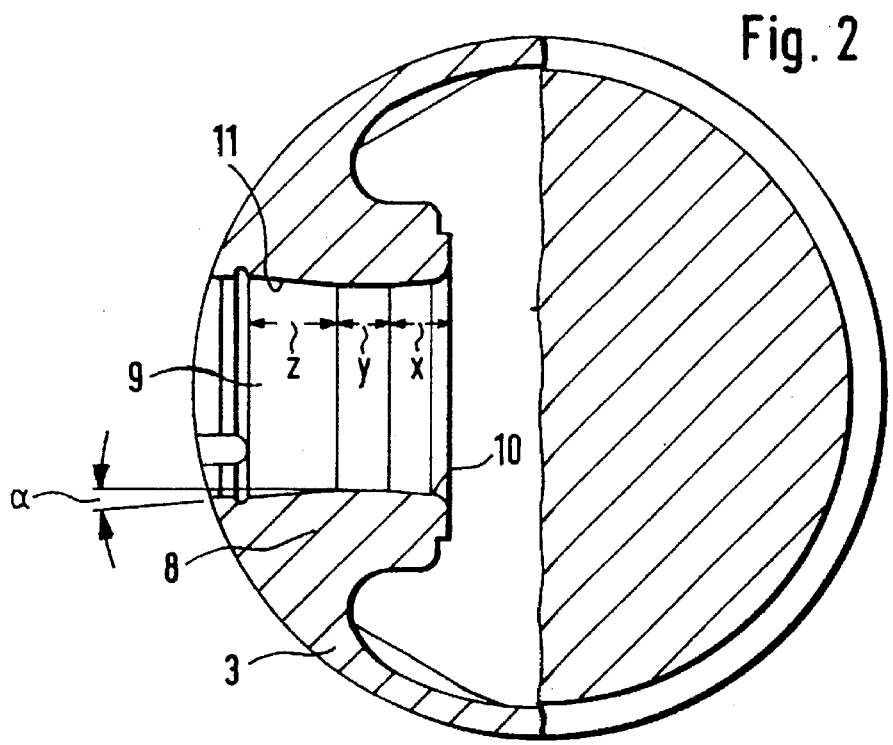
FIG. 2 shows a top view of the section along line II—II in FIG. 1.

A light metal piston 1 for an internal combustion engine, in particular for a highly stressed Diesel engine for a motor vehicle, consists in one piece of a piston head 2 and a piston skirt 3. A unreinforced combustion chamber trough 5 and the annular grooves 6 are shaped by molding in the piston bottom 4 of the piston head 2, whereby the uppermost annular groove 6 is reinforced with an annular support 7. The piston pin bosses 8 are integrated in the piston skirt 3, said bosses having the bores 9 for receiving a piston pin (not shown). Each bore 9 is, at its inner end 10, widened (cambered) in a part zone X toward the inner end, whereby the curvature of such widening may have the form of a polygon as shown in FIG. 5. The transition of said widening into the frontal surface of the boss has a radius of 3 mm, whereby the axial length of the rounding in the longitudinal direction of the piston pin comes to 1 mm in a piston with a diameter of 80 mm. Furthermore, in a part zone Z, the bore 9 is designed as a shaped bore 11 which, in the part zone Z, the latter extending from the outside inwardly and conforming to the supporting zone—which is outwardly limited by the groove for the safety ring of the piston pin—, conically widens from the inside outwardly, for example trumpet-like. The widening (in the drawing shown with an exaggerated size) has an angle alpha of 5 minutes. Such widening, which should have an angle of from 2 to 10 minutes, may be stepped as well, as shown in FIGS. 3 and 4, whereby the widening in the more inwardly disposed part zone Z of the shaped bore 11 should have a smaller angle than in the more outwardly disposed zone of the shaped bore 11.

Between the outwardly conically widening, shaped bore 11 in the part zone Z, and the widening (cambering) provided for at the inner end 10 in the part zone X, the bore 9 has a cylindrically extending zone Y.

Furthermore, in the bore 9 of each piston pin boss 8, a pocket-like recess (pocket 12) is shaped by molding on one side, namely in the direction of the counter-pressure side, such recess extending inclined, starting from the inner end 10 of the bore 9, whereby said recess, with respect to its vertical position, is disposed unsymmetrically with respect to the longitudinal axis of the piston pin and has its greatest depth at the inner end 10 of the bore 9, and ends after approximately ⅔rd's of the length of the bore 9 in the surface of the shaped bore 11. A connection between the inclined pocket 12 and the end of the bore 9 at the outer side of the piston is formed by a groove 13 extending in the direction of the longitudinal axis of the piston pin.

With such a design, a light metal piston is created in a simple way of engineering which, though the combination of its features, represents an optimized compromise with respect to bearable stresses due to increased ignition pressure on the edge of the trough, support and piston pin bosses.

We claim:

1. Light metal piston for highly stressed internal combustion engines, consisting of a piston head receiving the piston bottom with the combustion chamber trough and the annular groove part, and a piston skirt with integrated piston pin bosses, said piston being characterized by the combination of the following features:

(a) The combustion chamber trough in the piston bottom is unreinforced;

(b) the bore of each piston pin boss is widened (cambered) at its inner end towards the inner end at least in a part zone X of the total length of the boss bore;

(c) the bore of each piston pin boss is designed as a shaped bore, the latter substantially conically widening from the inside outwardly at least in a part zone Z of the total length of the boss bore, said part zone extending from the outside inwardly and conforming to the supporting zone;

(d) the bore of each piston pin boss has, on one side only, an inclined pocket starting from its inner end; and (e) the ignition pressure ocurring during combustion is greater than 120 bar.

2. Light metal piston according to claim 1, characterized in that the curvature of the widening in the part zone X at the inner end is designed as a polygon.

3. Light metal piston according to claim 1, characterized in that the bore of the piston pin boss, in the part zone Z, is widened from the inside outwardly trumpet-like.

4. Light metal piston according to claim 1, characterized in that the bore of the piston pin boss, in the part zone Z, has a widening with an angle alpha of 2 to 10 minutes.

5. Light metal piston according to claim 1, characterized in that the widening of the bore of the piston pin boss in the part zone Z is stepped.

6. Light metal piston according to claim 5, characterized in that the widening of the bore of the piston pin boss in the part zone Z has, on the inside, a smaller angle than the more outwardly disposed widening.

7. Light metal piston according to claim 6, characterized in that the inner widening disposed in the part zone Z has an angle of 2 to 4 minutes, and the outer widening has an angle of 5 to 10 minutes.

8. Light metal piston according to claim 1, characterized in that the bore has a cylindrical zone Y between the substantially conically outwardly widening, shaped bore in the part zone Z, and the widening provided at its inner end in the part zone X.

9. Light metal piston according to claim 1, characterized in that the inclined pocket in the bore of the piston pin boss is disposed on the side of the counterpressure direction.

10. Light metal piston according to claim 1, characterized in that the greatest depth of the inclined pocket is at the inner end of the piston pin boss.

11. Light metal piston according to claim 1, characterized in that the inclined pocket is shaped by molding with an angle of 2 to 5 degrees relative to a plane parallel with the longitudinal axis of the piston pin.

12. Light metal piston according to claim 1 characterized in that the inclined pocket is, with respect to its vertical position, arranged unsymmetrically relative to the longitudinal axis of the piston pin.

* * * * *